(12) United States Patent
Dickey et al.

(10) Patent No.: US 7,274,531 B2
(45) Date of Patent: Sep. 25, 2007

(54) EXTENDABLE STORAGE BIN MOUNTING FOR AUTOMATIC STORAGE LIBRARY

(75) Inventors: Peter Dickey, Costa Mesa, CA (US); Raoul Standt, Newport Beach, CA (US); Kurt Buckland, Yorba Linda, CA (US)

(73) Assignee: Quantum Corporation, San Jose, CA (US)

( * ) Notice: Subject to any disclaimer, the term of this patent is extended or adjusted under 35 U.S.C. 154(b) by 500 days.

(21) Appl. No.: 10/641,627

(22) Filed: Aug. 15, 2003

(65) Prior Publication Data

US 2005/0036230 A1   Feb. 17, 2005

(51) Int. Cl.
G11B 5/68 (2006.01)
G11B 17/22 (2006.01)
(52) U.S. Cl. .................... 360/92; 369/30.42
(58) Field of Classification Search ............ 360/92; 369/30.41, 30.68, 30.69, 30.42; 720/657, 720/654
See application file for complete search history.

(56) References Cited

U.S. PATENT DOCUMENTS

| | | | |
|---|---|---|---|
| 5,231,552 A | 7/1993 | Schneider et al. | |
| 5,454,485 A | 10/1995 | Dalziel | |
| 5,498,116 A | 3/1996 | Woodruff et al. | |
| 5,644,445 A * | 7/1997 | Ishikawa | 360/71 |
| 6,005,745 A | 12/1999 | Filkins et al. | |
| 6,097,566 A | 8/2000 | Heller et al. | |
| 6,158,942 A | 12/2000 | Apple et al. | |
| 6,385,145 B1 * | 5/2002 | Ostwald | 369/30.42 |
| 6,457,928 B1 | 10/2002 | Ryan | |
| 6,580,582 B1 | 6/2003 | Caverly | |
| 6,643,091 B2 * | 11/2003 | Coffin et al. | 360/92 |
| 6,661,747 B2 * | 12/2003 | Mueller et al. | 369/30.41 |
| 2001/0001635 A1 * | 5/2001 | Mueller et al. | 414/277 |

FOREIGN PATENT DOCUMENTS

| | | | |
|---|---|---|---|
| JP | 07130060 A | * | 5/1995 |
| JP | 08329638 A | * | 12/1996 |
| JP | 2000149378 A | * | 5/2000 |

* cited by examiner

Primary Examiner—William J Klimowicz
(74) Attorney, Agent, or Firm—Morrison & Foerster LLP

(57) ABSTRACT

In one exemplary embodiment an automated storage library is provided. The automated storage library may include a media drive, an array of storage bins for holding storage devices, and a robotic transfer mechanism for transporting storage devices between the media drive and the storage bins. The storage library includes a housing for supporting the media drive, the robotic transfer mechanism, and the storage bins, and a structure within the housing that is associated with one or more storage bins, wherein the structure is extendable at least partially from the housing.

30 Claims, 4 Drawing Sheets

EXTENDABLE STORAGE BIN MOUNTING FOR AUTOMATIC STORAGE LIBRARY

BACKGROUND OF THE INVENTION

1. Field of the Invention

The present invention relates generally to automated storage library systems, and more particularly to extendable storage bins and methods for storing and accessing storage devices in automated storage libraries.

2. Description of the Related Art

Magnetic tape cartridges have proven to be an efficient and effective medium for data storage in computer systems. Large computer systems may utilize numerous cartridges for data storage purposes as well as a plurality of tape drives for inputting and outputting data to and from storage cartridges in a timely manner. Typically, as the number of storage cartridges grows they are organized in automated storage libraries. Automated storage libraries including, for example, magnetic tape cartridges, may improve the access speed and reliability of data storage systems having large numbers of magnetic tape cartridges.

Automated cartridge libraries generally include a plurality of storage bins or slots for storing library tape cartridges, a robotic cartridge gripping mechanism (often referred to as a "picker"), and one or more tape drives. The robotic picker may be controlled to select a specific storage tape cartridge from the library and transfer the tape cartridge between a storage bin and a tape drive within seconds. The robotic picker typically includes a gripper or hand mechanism positioned on the robotic picker. The robotic picker may position the gripper near a desired tape cartridge and activate the gripper to engage or grip the tape cartridge to remove the cartridge from the storage bin. The robotic arm may move the gripper and tape cartridge to a location to load the tape cartridge into a tape drive, load port (for adding or removing a small number of cartridges from the library), and the like.

Large scale automated storage libraries may include cartridge capacities numbering in the hundreds or thousands. Storage cartridges are typically arranged in arrays of storage bins tightly stacked along the interior walls of a cabinet or housing of the automated storage library. Transferring large numbers of storage cartridges to and from the storage library, e.g., to initially populate a storage library, may be a time consuming process. Generally, large transfers are done manually while the system is offline. Manually transferring cartridges to and from storage bins generally requires a user to reach within the library housing to place the cartridges in storage bins. The design of typical large storage libraries includes housings that have narrow deep designs for use in computer room rack environments that may result in a user reaching a substantial distance within the library housing, often awkwardly, with the potential for contacting and damaging the system. Contact with the robotic picker mechanism, tape drives, and the like within the storage library housing may result in damage to the storage library system or injury to the user.

To reduce potential damage during transfers of a small number of storage cartridges, an automated storage library may include a load port where a small number of cartridges, e.g., ten cartridges, may be temporarily placed and subsequently added to the storage bin array. The robotic picker may retrieve the cartridges from the load port and store them throughout the library housing to more permanent storage bin locations. Initially populating a storage library with storage cartridges or during subsequent bulk transfers of storage cartridges using only the load port, however, may be greatly more time consuming than manually transferring cartridges. Therefore, to reduce the time of bulk transfers, users typically resort to manually transferring cartridges into the library housing as described above.

Therefore, what is needed is a system and method for allowing bulk transfers of storage devices to and from automated storage libraries in a timely manner and with reduced potential for damage to the library system or injury to the user. Further, a system and method for allowing bulk transfers of storage cartridges at reduced cost and complexity to the library system are needed.

BRIEF SUMMARY OF THE INVENTION

In one exemplary embodiment an automated storage library is provided. The automated storage library may include a media drive, an array of storage bins for holding storage devices, and a robotic transfer mechanism for transporting storage devices between the storage bins and the media drive. The storage library includes a housing for supporting the media drive, the robotic transfer mechanism, and the storage bins, and a structure within the housing that is adapted to be associated with one or more storage bins, wherein the structure is slidably attached to the housing and extendable at least partially from the housing.

In another exemplary embodiment a method for transporting storage devices to and from an automated storage library is provided. The method includes translating one or more storage bins enclosed within a storage library housing to extend at least partially from the storage library housing, and transferring a storage cartridge to and/or from the one or more storage bins.

The present invention and its various embodiments are better understood upon consideration of the detailed description below in conjunction with the accompanying drawings and claims.

DETAILED DESCRIPTION OF THE INVENTION

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

An exemplary storage library includes storage bins that may extend at least partially away from the library housing. One or more panels having storage bins attached thereto may be mounted to the storage library housing on sliding hardware or the like and configured to translate from a relatively inaccessible location within the housing to a more accessible location for storage cartridge transfers. For example, storage bins may become more accessible and decrease the risk of damage to the user or the storage library components during transfers of storage cartridges by extending the bin panels at least partially from the housing to a user. The sliding panels may retract back into the housing after a transfer process is complete such that the storage bins are within the housing during normal operation of the storage library. The storage library may further include latches or locking devices to hold the panels in place during operation and prevent inadvertent access to the panels when the library is in use.

Figure 1:
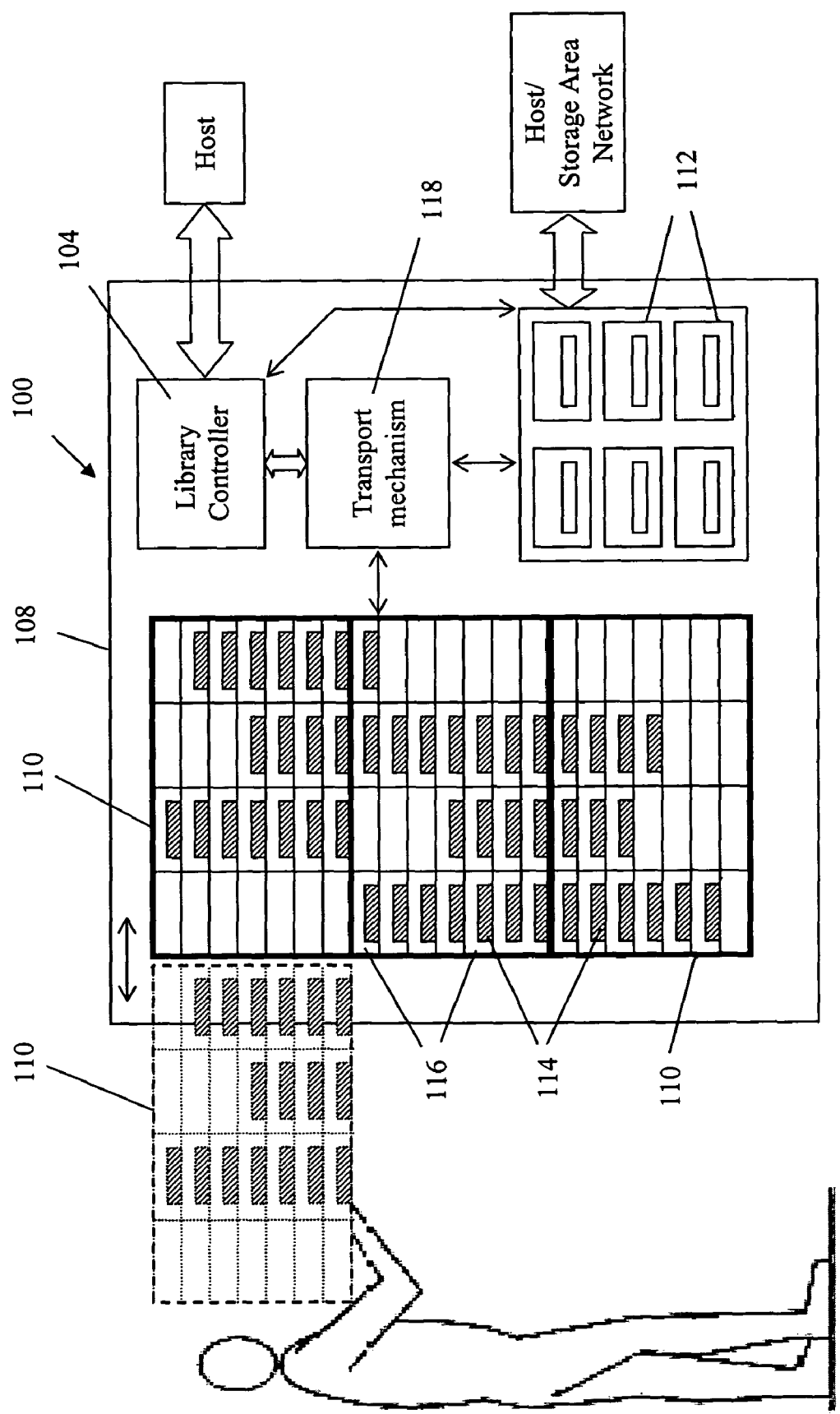
FIG. 1 illustrates an exemplary automatic storage library having extendable bin mounting panels.

FIG. 1 is a schematic illustration of an exemplary automated storage library system 100 for the storage and retrieval of a plurality of storage cartridges 114 stored therein. Library system 100 includes one or more media drives 112, a plurality of storage tapes or cartridges 114 stored in slots or storage bins 116, and a transport mechanism 118 that may be equipped with a picker mechanism (not shown) for transporting a selected cartridge 114, for example, between a drive 112 and a storage bin 116.

Storage bins 116 are arranged on one or more movable bin panels 110 that include structures adapted to translate and extend partially or fully from housing 108. The design, location, and number of storage bins 116 may vary depending on the design of cartridges 114 and library system 100. In one example, storage bins 116 are rectangular shaped slots sized and shaped to hold a single cartridge 114. Additionally, storage bins 116 may be angled and include detent features or the like to secure cartridge 114 therein.

Storage bins 116 may be arranged within library system 100 and housing 108 in various configurations based on considerations relating to the physical housing dimensions or the operation of the transfer mechanism 118. A portion or all of storage bins 116 may be disposed within housing 108 in locations that may require a user to awkwardly or otherwise reach within the library housing 108 to gain access to storage cartridges 114. Movable panels 110 may translate and extend partially or fully from housing 108 to expose one or more storage bins 116 and/or move storage bins 116 to more accessible locations for transfers of storage cartridges 114. Reducing or eliminating the distance the user must reach into or enter library housing 108 may decrease the potential for damage to library system 100 and injury to the user.

Automated storage library system 100 may further include one or more load ports (not shown). Load ports are generally small access doors wherein a small number of storage cartridges may be temporarily placed for transfer to and from the library system by the transport mechanism 118, e.g., a robotic picker mechanism. For example, cartridges 114 may be manually added to the load port for temporary storage and the robotic picker mechanism then transports cartridges 114 to storage bin 116 locations within the library system 100. Additionally, when removing cartridges 114 from the library system 100, the robotic picker mechanism may transfer cartridges 114 from storage bins 116 to the load port for temporary storage and then manually removed. To reduce transfer time, for example, when initially populating a library system 100 or during large transfers of storage cartridges 114, the present example allows a user to more conveniently place cartridges 114 directly in their storage bins 116.

Storage library system 100 further includes a library controller 104 that communicates with a host processor or computer network to control the actions of transport mechanism 118 and drives 112 to retrieve and/or store data. Library controller 104 may include a single general purpose computer, microprocessor, microcontroller, and the like. Alternatively, a separate cartridge loader controller and a library system controller may be included. Library controller 104 may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter Integrated Circuit bus (I2C), Small Computer System Interface (SCSI), ultra-wide SCSI, fast SCSI, fibre channel, and the like.

Library controller 104 operates to coordinate movements and actions of media drives 112, robotic transport mechanism 118, and the like. The controller 104 may include a suitable processor as described above and is typically interconnected with a host processor, which sends access commands to controller 104. In this example, information recorded to or read from one or more of the cartridges 114 is transmitted between one of the drives 112 to the host or a storage area network through a second data path connection, e.g., a fibre channel bridge or the like.

Transport mechanism 118 may include any suitable robotic mechanism including various mechanisms to translate in two or three dimensions within housing 108. Any suitable gripper mechanism may be attached to the robotic mechanism to physically grip and transport cartridges 114. For example, a gripper mechanism may include opposing upper and lower jaws to engage a cartridge 114 on opposing top and bottom major surfaces. Alternatively, a gripper mechanism may include opposing jaws arranged to engage a cartridge 114 on opposing minor or side surfaces.

Media drives 112 may include various media types, for example, magnetic tape drives, optical disk drives, and the like. Cartridges 114 may include any suitable storage devices, for example, magnetic storage devices, optical storage devices, and the like. An exemplary media drive 112 includes the SDLT™ 320 magnetic tape drive, and an exemplary storage cartridge includes the Super DLTape™ Type I storage cartridge both sold by Quantum Corporation. The examples described herein are generally described as a magnetic tape library including multiple magnetic tape cartridges. It should be understood, however, that the various embodiments are contemplated with use for other types of storage media and storage media libraries. For example, a storage library may include optical media devices alone or in combination with magnetic media storage devices and the like.

Automated storage library system 100 may further include various other features including various access doors, control panels, power supplies, electrical/interface connections, barcode scanners, calibration sensors/cameras, and the like as are known in the art. For clarity, however, such additional features have been omitted from the description.

Figure 2A:
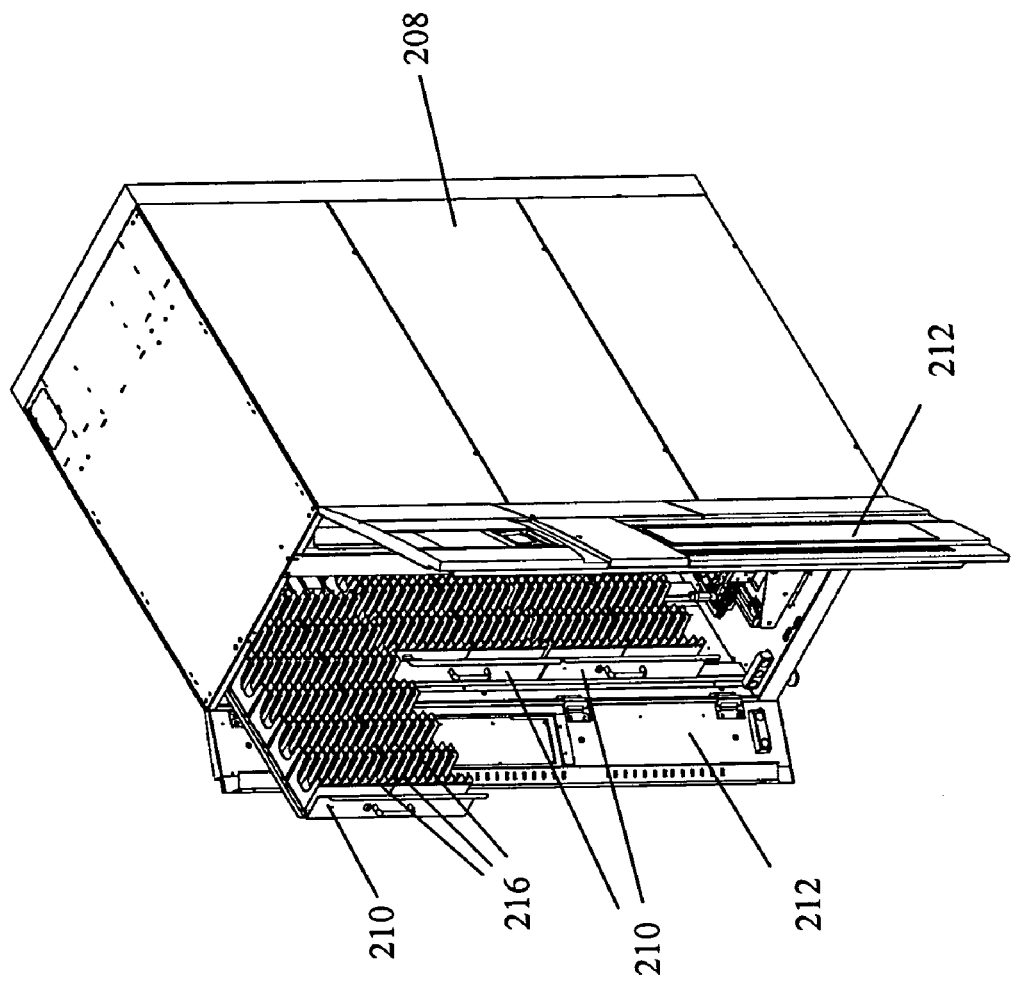
FIGS. 2A and 2B illustrate an automatic storage library having exemplary extendable bin mounting panels.
Figure 2B:
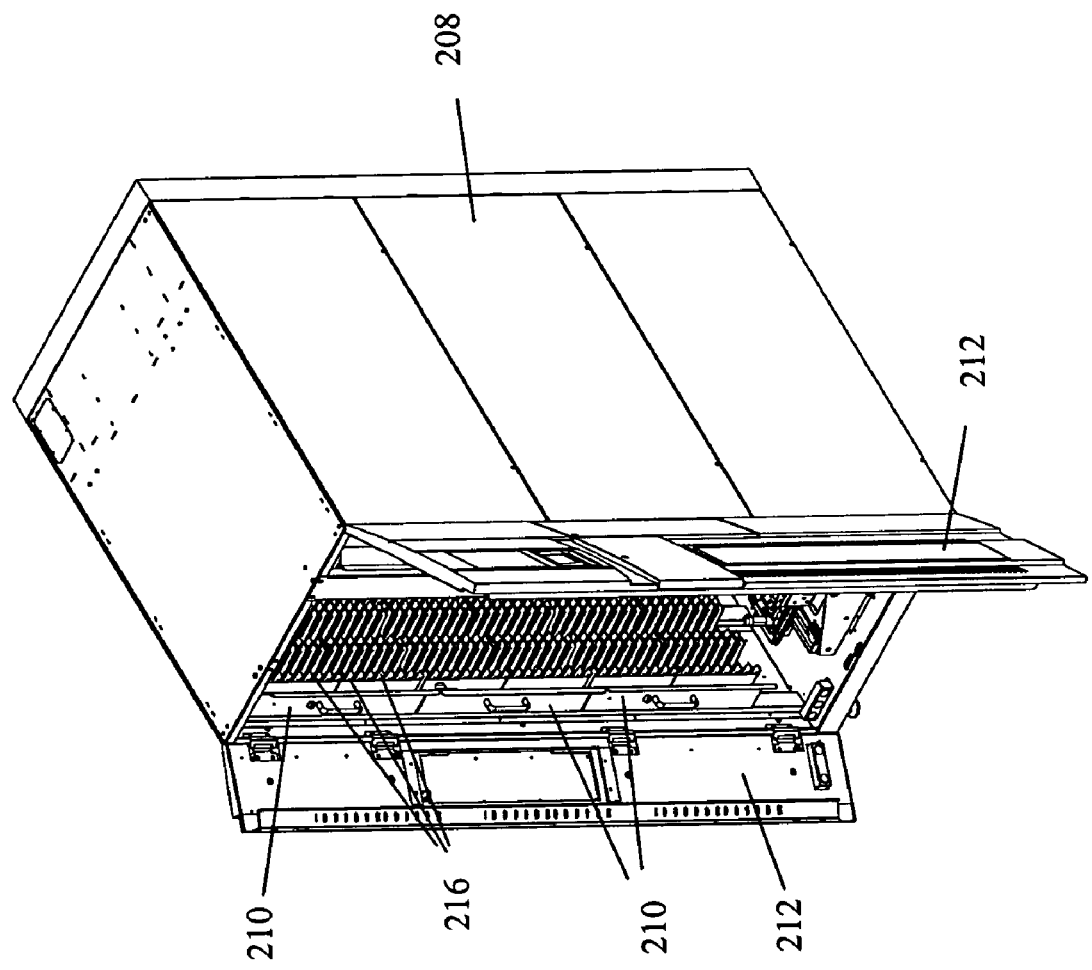

FIGS. 2A and 2B illustrate a perspective view of an exemplary automated storage library housing 208 having extendable bin panels 210 in an extended and retracted position respectively. Housing 208 has a generally rectangular frame and may include planar walls to define a cavity enclosing bin panels 210, storage bins 216, media drives (not shown), a transport mechanism (not shown) and various other features of automated library systems. Further, the opening of housing 208 may include one or more pivotably mounted doors 212 to allow access to the interior of housing 208.

Each bin panel 210 includes a plurality of storage bins 216 for storing storage cartridges therein. In this example, three bin panels 210 are visible and are slidably attached to housing 208 such that they may slide or translate horizontally to extend at least partially from housing 208 as shown in FIG. 2A. Each bin panel 210 may move linearly and generally parallel to the opening of storage bins 216, e.g., orthogonal to the direction the picker mechanism (not shown) moves to place and pick storage cartridges within storage bins 216

In this example, housing 208 includes a form factor that is narrow and deep similar to common 19 inch rack shelves and the like typical in computer room rack environments. An automated library housing 208 having narrow and/or deep dimensions may result in a user having to awkwardly extend into the library housing 208 to transfer cartridges thereby increasing the possibility of injury to the user or damage to the library system, e.g., the robotic picker mechanism and the like. The extension of bin panels 210 allows a user to access storage bins 216 for loading and unloading cartridges without reaching into the housing, or at least making cartridges more accessible to a user near an opening of housing 208.

In one example, bin panels 210 are mounted to a movable portion of a drawer slide assembly (see FIG. 3). An exemplary drawer slide assembly may include guides, rollers, and the like having a first stationary portion fixed to a stationary portion of the frame or housing 208 and a second movable portion attached to or including bin panel 210. In one example, the fixed half of the drawer assembly is mounted on an interior wall of the library housing 208 with a translatable bin panel 210 attached thereto. Additionally, bin panels 210 may be mounted to other movable structures to allow bin panels 210 to translate or rotate and extend at least partially from the frame of the library system to more accessible locations.

In other examples, housing 208 may include multiple openings on one or more walls of housing 208 having different extendable bin panels 210 associated with different openings. Further, housing 208 may include various other shapes and dimensions such as square, wide and shallow, curved, and the like.

Bin panels 210 may also include various sizes and shapes such as rectangular, curved, and the like. Each bin panel 210 may include any number of associated storage bins 216. In one example, bin panel 210 includes 12 bin packs having 8 storage bins 216 each for a capacity of 72 storage bins 216 associated with each bin panel 210. More or fewer associated storage bins 216 are contemplated. Further, a library system may include any number of extendable bin panels 210. The design, location, and number of bin panels 210 and associated storage bins 216 may vary according to the design and configuration of the storage library system.

Bin panels 210 may have storage bins 216 attached thereto by any suitable manner. Storage bins 216 or columns of storage bins 216 may be removably or non-removably fixed to bin panels 210. For example, storage bins 216 or columns of storage bins 216 may be releasably attached to substantially planar bin panels 210 such that storage bins 216 may be easily removed and replaced if desired. Further, storage bins 216 and bin panels 210 may be co-molded or integrally formed as a single structure and slidably attached to housing 210.

Bin panels 210 may further include a latch to hold or lock the panels in place and prevent inadvertent access to the storage cartridges during operation of the storage library system. Further, a door sensor may be included to provide a door open and/or closed signal to the library controller. For example, opening a latch may send a signal from the door sensor to the library controller to take the system off-line. Alternatively, the latch may be mechanically or electrically closed such that bin panels 210 are selectively slidable only when the system has been taken off-line.

Figures 3A, 3B:
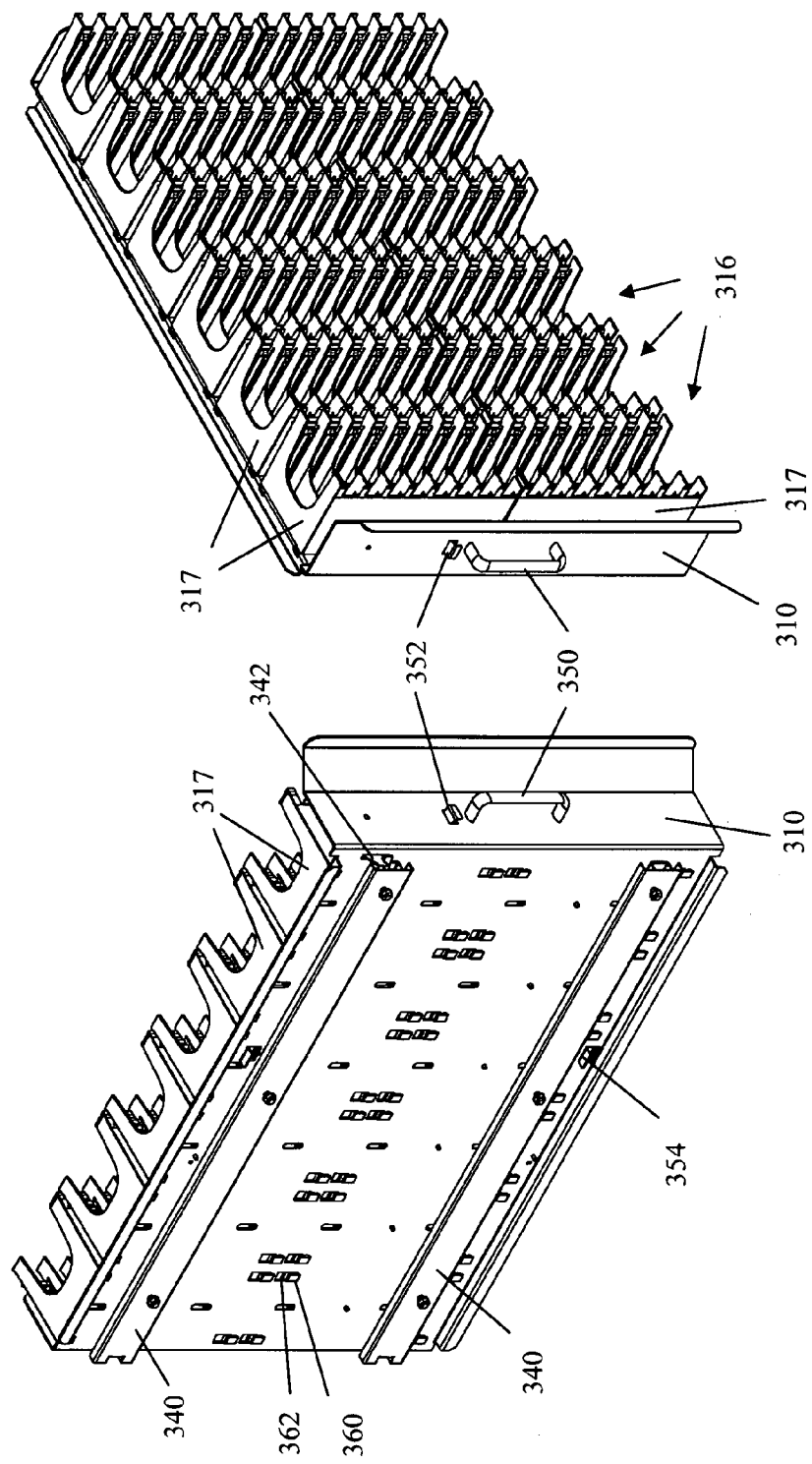
FIGS. 3A and 3B illustrate an exemplary bin mounting panel including a sliding mechanism for extending the bin mounting panel.

FIGS. 3A and 3B illustrate an exemplary bin panel 310 assembly for translating and extending at least partially from a storage library housing. Bin panel 310 includes a plurality of storage bins 316 grouped in bin packs 317, and two slide rails 340 along bin panel 310. The slide rails 340 interact with rollers, rails, or the like attached to the library housing to slide and extend therefrom. Exemplary slide rails 340 include slide rails manufactured by Accuride International, Inc.; however, any suitable sliding hardware may be employed. Alternatively, bin panel 310 may include rollers that interact with guide rails attached to the library housing. It should be recognized that the exemplary sliding assembly is illustrative only and various other mechanisms and hardware are possible and contemplated.

Bin panel 310 may further include a locking mechanism 342, handle 350, unlocking mechanism 352, and flag 354. Slide rails 340 may include a locking mechanism 342, e.g., a latch or the like, securing bin panel 310 in place within the housing. Unlocking mechanism 352 may be used to release locking mechanism 342 and may include a push button or finger operated lever, or the like. Handle 350 may vary in size and location to allow a user to easily grab and translate bin panel 310.

Bin panel 310 may also include a flag 354 to trigger a sensor that bin panel 310 is in a retracted and/or in an extended position. In one example, the sensor is an optical sensor attached to the library housing. Other suitable sensors, such as magnetic sensors and the like may be used.

Bin packs 317 may be releasably attached to bin panel 310 through tabs 360 attached to bin packs 317 and fitted within openings 362 of bin panel 310. This allows a user to remove and replace an entire bin pack 317 of storage bins 316. In this example, bin packs 317 are releasable by lifting and translating slightly away from bin panel 310. It should be recognized, however, that various other methods of releasably attaching bin packs 317 or storage bins 316 are possible.

The above detailed description is provided to illustrate exemplary embodiments and is not intended to be limiting. It will be apparent to those skilled in the art that numerous modification and variations within the scope of the present invention are possible. Accordingly, the present invention is defined by the appended claims and should not be limited by the description herein.

The invention claimed is:

1. An automated storage library, comprising:
    a housing for supporting a media drive, a robotic transfer mechanism, and storage bins; and
    a structure slidably attached to the housing for supporting a plurality of separately removable storage bin packs, wherein each of the separately removable storage bin packs define at least two storage bins for receiving a storage device through an opening thereof, the plurality of storage bin packs arranged in at least a two-by-two array of bin packs, and
    wherein the structure is extendable at least partially from the housing, the structure extending from the housing in a direction parallel to the opening of the storage bins.

2. The storage library of claim 1, wherein the structure includes a sliding assembly adapted to allow the structure to extend from the housing.

3. The storage library of claim 2, wherein the sliding assembly includes a guide rail and rollers.

4. The storage library of claim 1, wherein the structure includes a substantially planar panel with the plurality of storage bin packs removably attached thereto.

5. The storage library of claim 4, wherein the storage bin packs are removably attached to the panel.

6. The storage library of claim 1, wherein the structure translates linearly to extend from the library housing.

7. The storage library of claim 1, wherein the structure translates horizontally to extend from the library housing.

8. The storage library of claim 1, further including a releasable latch to secure the structure within the housing.

9. The storage library of claim 1, further including at least a second structure associated with one or more storage bins, wherein the structure is slidably attached to the housing to extend at least partially from the housing to expose at least one storage bin.

10. The storage library of claim 1, wherein the housing includes a door, and the structure is extendable through an opening of the housing when the door is open.

11. The storage library of claim 1, further including a load port for adding storage devices to the library.

12. The storage library of claim 1, wherein the storage devices include magnetic tape cartridges.

13. An automated storage library housing, comprising:
a library housing;
a plurality of separately removable storage bin packs for holding storage devices, wherein each of the separately removable storage bin packs define at least two storage bins for receiving a storage device through an opening thereof, the plurality of storage bin packs arranged in at least a two-by-two array of bin packs; and
a structure within the housing and associated with the plurality of separately removable storage bin packs, wherein the structure is slidably attached to the housing to translate from a first position within the housing to a second position extending at least partially from the housing, the structure translating from the housing in a direction parallel to the opening of the storage bins.

14. The automated storage library housing of claim 13, wherein the structure includes a sliding assembly adapted to allow the structure to extend from the housing.

15. The automated storage library housing of claim 14, wherein the sliding assembly includes a guide rail and rollers.

16. The automated storage library housing of claim 13, wherein the structure includes a substantially planar panel with the plurality of storage bin packs removably attached thereto.

17. The automated storage library housing of claim 13, wherein the structure translates horizontally to extend from the library housing.

18. The automated storage library housing of claim 13, further including a releasable latch to secure the structure within the housing.

19. The automated storage library housing of claim 13, further including at least a second structure associated with one or more storage bins, wherein the structure is slidably attached to the housing to translate and extend at least partially from the housing.

20. The automated storage library housing of claim 13, wherein the housing includes a door, and the structure is extendable through an opening of the housing when the door is open.

21. The automated storage library housing of claim 13, further including a load port for adding storage devices to the library housing.

22. The automated storage library housing of claim 13, wherein the storage devices include magnetic tape cartridges.

23. A method for transferring cartridges to and from an automated library system, comprising:
translating a plurality of separately removable storage bin packs coupled to a common structure and enclosed within a storage library housing to extend at least partially from the storage library housing, wherein each of the separately removable storage bin packs define at least two storage bins for receiving a storage device through an opening thereof, the plurality of storage bin packs arranged in a at least a two-by-two array of bin packs, and
wherein the structure translates from the housing in a direction parallel to the opening of the storage bins.

24. The method of claim 23, wherein the plurality of storage bin packs translate horizontally to extend at least partially from the storage library.

25. The method of claim 23, wherein the plurality of storage bin packs are associated with a panel slidably attached to the library housing.

26. The method of claim 25, wherein the panel is attached to the storage library housing with a sliding assembly.

27. The method of claim 25, wherein the panel is attached to the library housing through a guide rail and rollers.

28. The method of claim 23, further including opening an access door to allow for translation of the plurality of storage bin packs to extend at least partially from the storage library.

29. The method of claim 23, further including taking the library offline before translating the plurality of storage bin packs to extend at least partially from the storage library.

30. The method of claim 23, wherein the plurality of storage bin packs are unlatched prior to translating the plurality of storage bin packs to extend at least partially from the storage library.

* * * * *